AUTOMATIC PHASE CONTROL SYSTEM
Filed Aug. 22, 1963
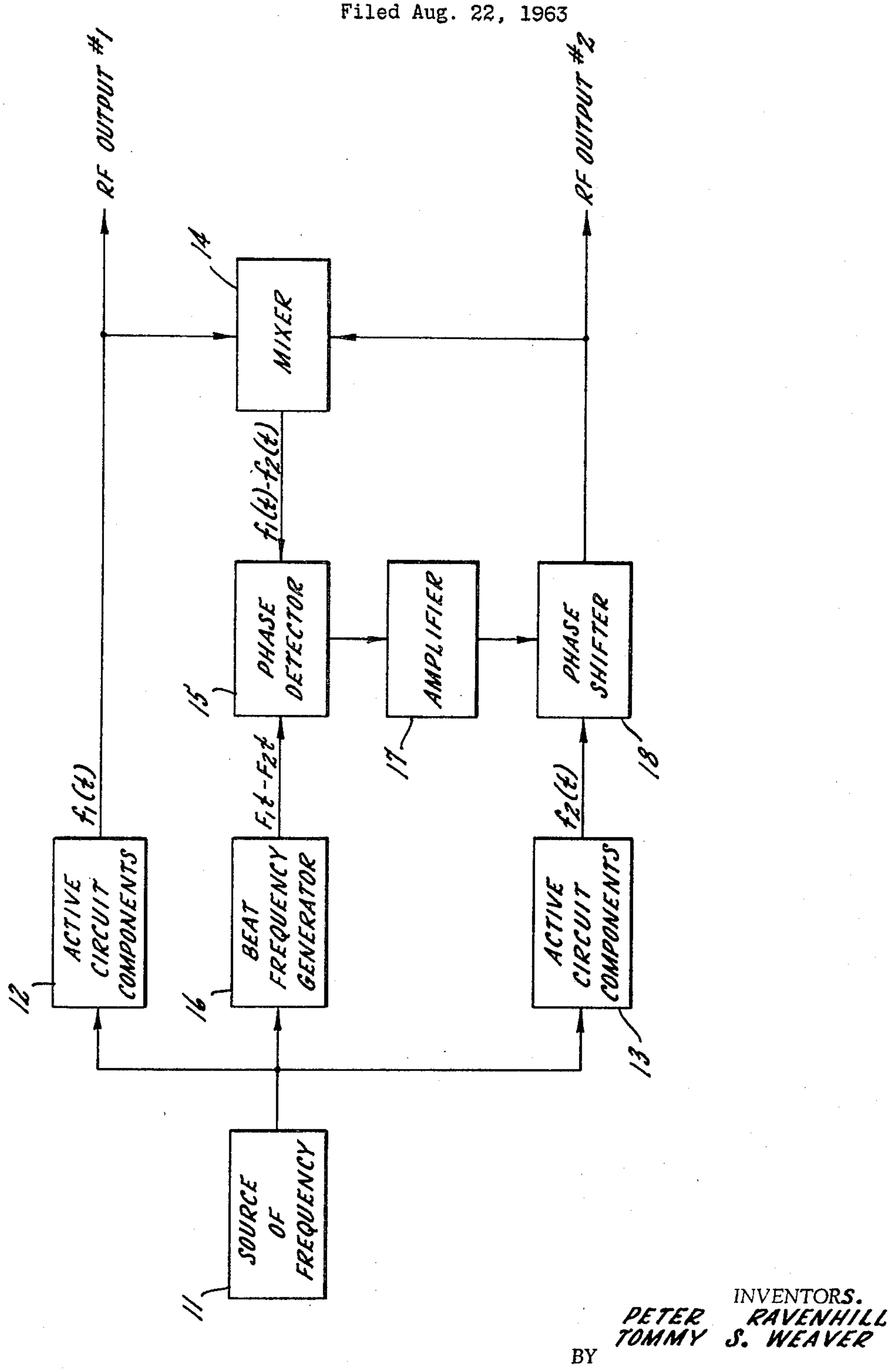
INVENTORS.
PETER RAVENHILL
TOMMY S. WEAVER
BY
H. H. Losche
Paul S. Collignon ATT'YS.

United States Patent Office 3,267,357
Patented August 16, 1966

3,267,357
AUTOMATIC PHASE CONTROL SYSTEM

Peter Ravenhill, Baltimore, and Tommy S. Weaver, Glen Burnie, Md., assignors, by mesne assignments, to the United States of America as represented by the Secretary of the Navy Filed Aug. 22, 1963, Ser. No. 303,972
1 Claim. (Cl. 323—101)

The present invention relates to an automatic phase control system and more particularly to a device for providing a definite phase relationship between two RF output signals at different frequencies.

In the radar art, it is desirable at times to hold two or more RF output signals in a definite phase relationship. Various devices are known that will maintain a phase relationship, particularly when the two outputs are at the same frequency. For example, in U.S. Patent 2,851,658, which was issued September 9, 1958, to Louis Howson, there is shown and described a phase shifting circuit that employs a frequency control action to maintain a slave oscillator at precisely the same frequency value of a master oscillator. Any frequency difference between the master and slave oscillator appears as a phase change in a detector and is corrected until the frequency difference is removed. Thus exact phase relationship, as well as exact frequency, is maintained automatically.

In the present invention, an automatic control circuit is provided that will maintain a fixed phase relationship between two or more RF output signals that are at different frequencies. Two transmission paths are provided, each operating at a different frequency due to modulation, noise, and temperature variations. A sample of each transmission path is applied to a mixer, the output of which is fed to a phase detector. A beat frequency generator also provides an input to the phase detector. This beat frequency is equal to the difference of frequencies in the two transmission paths. The output of the phase detector is amplified and then fed to a phase shifter which is located in one of the transmission paths. This phase shifter corrects the phase in the transmission path within which it is located so that it is in the required phase with respect to the other transmission path.

It is therefore a general object of the present invention to provide an improved system for maintaining the phase difference of two output signals to a constant value.

Another object of the present invention is to maintain the beat frequency between two outputs of different frequencies constant relative to a reference frequency.

Other objects and advantages of the present invention will be readily appreciated as the same becomes better understood by reference to the following detailed description when considered in connection with the accompanying drawing wherein the figure is a block diagram showing a preferred embodiment of the present invention.

Referring now to the drawing, a single source of frequency 11 is shown as providing an input to a group 12 of active circuit components and also to a group 13 of active circuit components. The output, $f_1$, of group 12 differs in frequency from the output, $f_2$, of group 13 due to various factors, such as modulation, noise, and temperature. It is desired, however, to have a phase difference that is constant within a few degrees.

A sample each of RF output No. 1 and RF output No. 2 is fed to a mixer 14, the output of which is fed to a phase detector 15. A beat frequency generator 16 provides a reference $(f_1-f_2)$, which is also fed to phase detector 15. The difference between the input from mixer 14 and the input from the beat frequency generator 16, which difference is referred to as phase error, is detected by phase detector 15. This phase error, if present, is then amplified by amplifier 17 and then fed to phase shifter 18 which is located in the transmission path of RF output No. 2.

In operation, assuming that the phase difference between RF output No. 1 and RF output No. 2 is at the desired constant value, then the relationship of the phases can be shown mathematically as:

$$(f_1t-f_2t)=(F_1t-F_2t) \tag{1}$$

and phase detector 15 would not provide any output.

Assuming now that the output of group 12 would change by $\Delta f_1(t)$ then:

$$f_1(t)+\Delta f_1(t)-f_2(t)>F_1t-F_2t \tag{2}$$

When the condition of Equation 2 occurs, the input to phase detector 15 from mixer 14 will differ from the beat frequency, and the difference, which is referred to as phase error, will be detected and amplified and then fed to phase shifter 18. Phase shifter 18 will then cause the phase in the second transmission path to shift so that the phase difference at the two outputs will be held to a constant value.

It can thus be seen that the present invention provides a relatively simple device for automatically maintaining a phase relationship between RF output signals that are at different frequencies.

Obviously many modifications and variations of the present invention are possible in the light of the above teachings. It is therefore to be understood, that within the scope of the appended claim, the invention may be practiced otherwise than as specifically described.

What is claimed is:

A system for automatically maintaining a constant phase shift between two output signals of different frequencies comprising:

first and second transmission paths, each providing an output signal of different frequency,
a beat frequency generator,
a mixer having a separate input from each of two transmission paths,
a phase detector connected to the output of said mixer and the output of said beat frequency generator, and
a phase shifter connected in one of said transmission paths and having its input connected to said phase detector whereby the phase shift between said outputs is maintained at a constant value.

References Cited by the Examiner

UNITED STATES PATENTS

| | | | |
|---|---|---|---|
| 2,545,296 | 3/1951 | Mittlemann | 331—175 |
| 2,600,288 | 6/1952 | Zylstra | 331—175 |
| 2,968,007 | 1/1961 | Hansen et al. | 331—11 |
| 3,011,123 | 11/1961 | Povey | 323—121 |
| 3,023,370 | 2/1962 | Waller | 324—83 |

OTHER REFERENCES

Taylor: "Controlled Beat Frequency Oscillator," Radio-Electronic Engineering, pp. 15–17, 34, 35, March 1955.

JOHN F. COUCH, *Primary Examiner.*

LLOYD McCOLLUM, *Examiner.*

A. D. PELLINEN, *Assistant Examiner.*